Nov. 1, 1955
R. C. FARNEY
2,722,095
LAWN EDGER AND TRIMMER
Filed Jan. 5, 1953
2 Sheets-Sheet 2
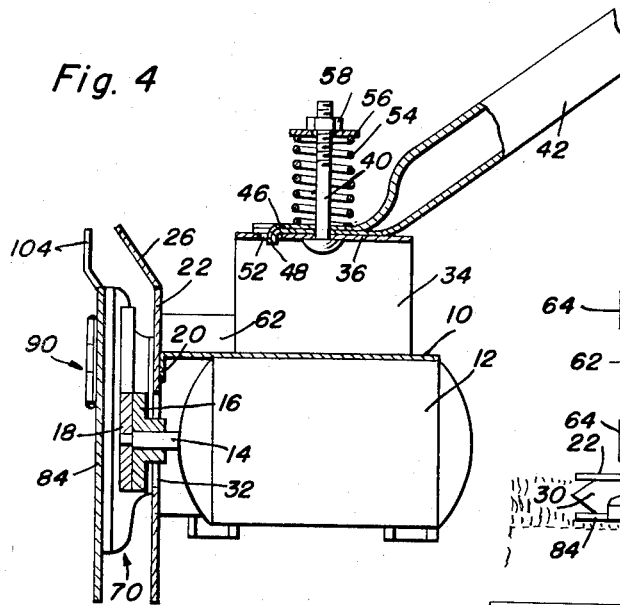
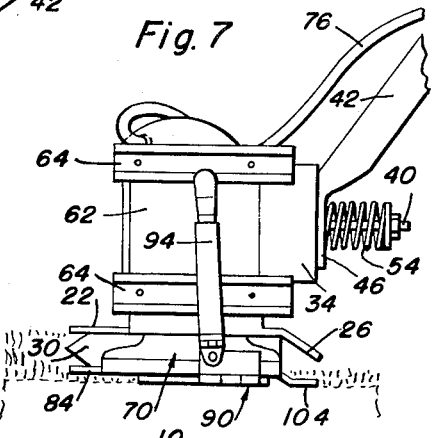
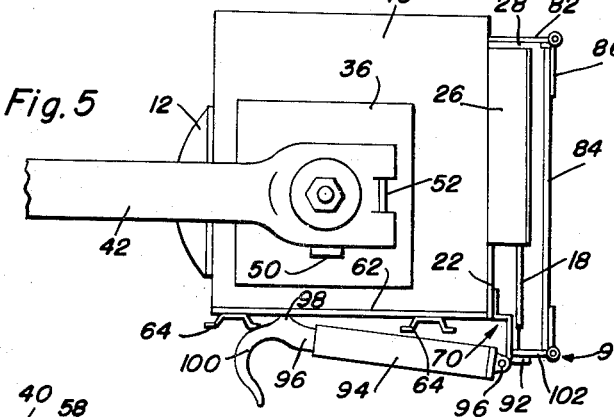
Raymond C. Farney
INVENTOR.

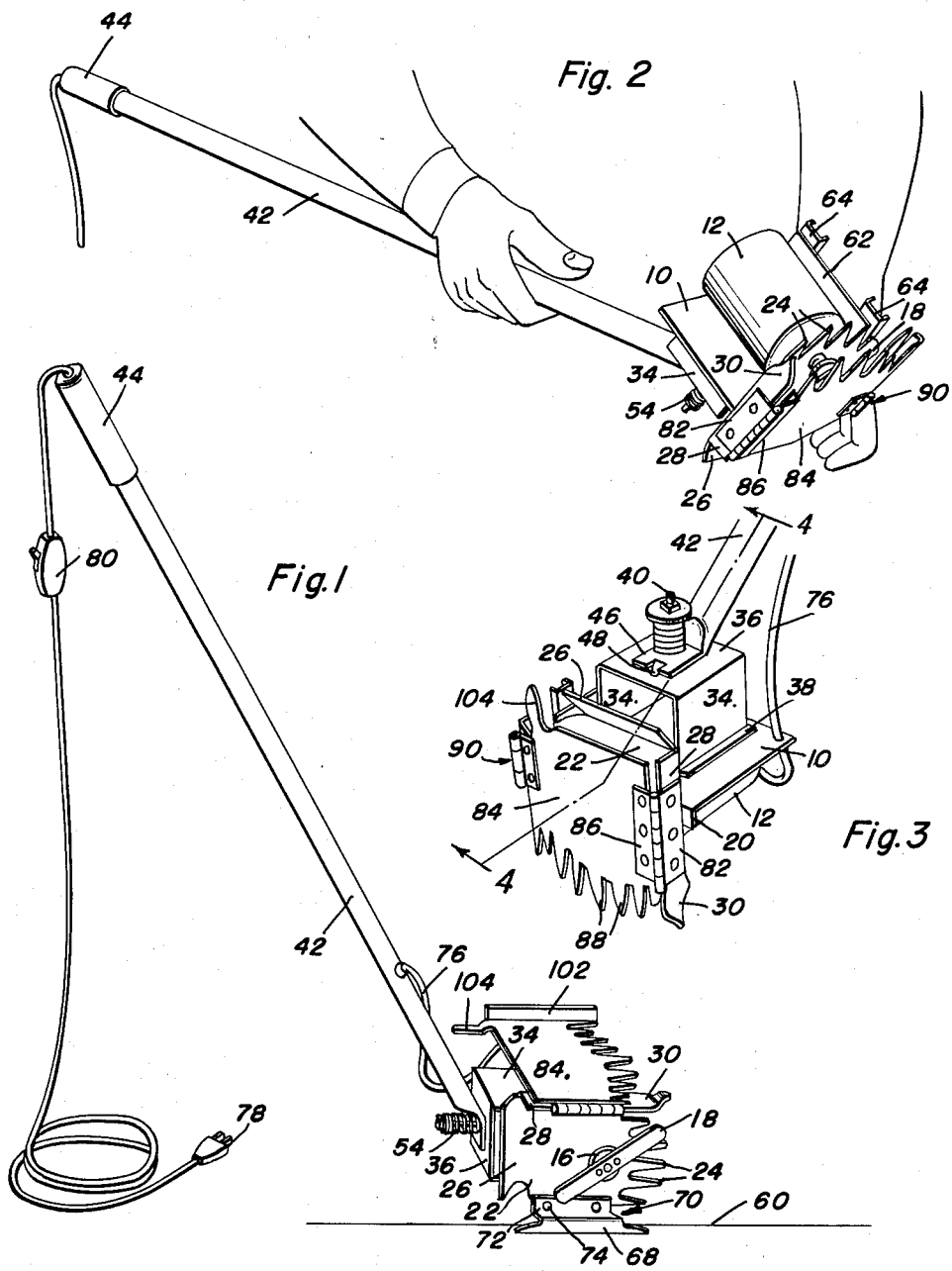

United States Patent Office 2,722,095
Patented Nov. 1, 1955

2,722,095

LAWN EDGER AND TRIMMER

Raymond C. Farney, Dallas, Tex.

Application January 5, 1953, Serial No. 329,592

8 Claims. (Cl. 56—25.4)

This machine relates to grass cutting equipment and more particularly to a machine which may be used for edging and trimming operations and which also may be used for cutting hedges and the like.

An object of this invention is to provide a machine for cutting grass along the edges of side walks, curbs, walls, fences and the like.

Another object is to provide a machine which may be used for edging and trimming operations and which may be readily converted for one use to the other.

Another object is to provide a machine of the character described which may be easily converted for use as a trimmer to use as an edger by manipulation of its handle assembly.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the machine resting upon a supporting surface and in position to perform edging operations;

Figure 2 is a perspective view of the device being manipulated by an operator for conversion to a trimmer;

Figure 3 is another perspective view of the device showing a portion of the handle in position for utilizing the machine as a trimmer;

Figure 4 is a vertical section of the device taken substantially on line 4—4 of Figure 3, and showing details of its construction on an enlarged scale;

Figure 5 is a top plan view of the machine of Figure 6;

Figure 6 is a side elevation of the device in position for trimming on the side of a hedge, for example; and, Figure 7 is a side elevation showing the machine being used for trimming grass.

Referring now more particularly to Figures 3–5, numeral 10 indicates a base or main supporting plate which carries at one side thereof an electric motor 12 including the longitudinally extending drive shaft 14 upon which is mounted a flange element 16 for the purpose of securing a rotary cutting blade 18 thereto. One edge of base plate 10 is provided with a downturned flange 20 to which a guard or guide plate 22 is attached. The guide is disposed in parallel relation to blade 18 and perpendicular to base plate 10 and extends beyond the opposite sides thereof. An edge of the guide is cut away to form a plurality of guide fingers 24 in generally arcuate relation with one another and which are adapted to receive blades of grass in the spaces therebetween whereby the cutter blade 18, in passing across the fingers and intermediate spaces, will sever or cut such grass. The end of the guide opposite fingers 24 is bent outwardly in the direction of the rotary blade to provide a deflector plate or flange 26. An intermediate edge of the guide is bent inwardly at right angles to the cutter blade defining a mounting flange 28 having a guide finger 30 adjacent fingers 24 to cooperate therewith in positioning the grass for proper cutting action by the rotary blade 18. Also, guide 22 is provided with an aperture 32 in register with and which allows withdrawal therethrough of flange member 16 when blade 18 is disengaged from the flange.

On the opposite side of plate 10 from motor 12, a U-shaped bracket having leg portions 34 and an interconnecting bight portion 36 is secured in any suitable manner, by means of foot flanges 38, for example, being welded to the base plate 10. Centrally disposed of bight portion 36 is a pivot pin 40 having a threaded upper end. A handle 42 having a hand grip 44 at one end and terminating in an angulated portion 46 is received on the pivot pin 40 through an aperture in the flatten end portion 46. As most clearly shown in Figures 3 and 4, the flatten end portion has a projection 48 struck downwardly from its free edge and, when the handle is received on the pivot pin 40 the projection is engageable within either the aperture 50 or the aperture 52, dependent upon the position of handle 42 relative to the bracket. To maintain the flatten end of the handle in engagement with bight portion 36, a coil spring 54 is disposed concentrically of the bolt 40 and a washer 56 and nut 58 serve to compress spring 54 against the flatten end 46, thereby maintaining projection 48 within its cooperating aperture. When it is desired to rotatably shift the handle with respect to bight portion 36, it is merely necessary to press downwardly on handle 42 to lift the free end of flattened portion 46 away from the bight portion so that the entire handle assembly may be rotated 90° in one direction or another to allow projection 48 to engage within the desired aperture in bight portion 36. The purpose of shifting the handle assembly in this manner will presently be apparent.

Referring now more particularly to Figure 1, it will be noted that handle 42 is positioned on the bracket such that it extends generally parallel to the plane of rotation of blade 18 and it will be understood that in the position shown, the device is intended for use as an edger which may be guided along the edge 60 of a curb, side walk, or the like. For the purpose of guiding the device along this edge, a runner plate 62 is secured along one edge of base plate 10 and to an abutting face of guide 22. In this respect, it will be seen that the runner plate is disposed perpendicular to both base plate 10 and guide 22 and extends beyond both sides of the base plate. A pair of runners 64 are secured by rivets 66 to the outer surface of runner plate 62 in spaced parallel relation to guide 22. In order to properly guide the assembly along the edge of the side walk or the like, runners 64 rest upon the horizontal surface thereof and the vertical foot portion 68 of an angulated bracket 70 contacts the vertical face of the side walk. Bracket 70 includes a flange portion 72 which is riveted as at 74, to guide 22.

Accordingly, when electric motor 12 is supplied with current through the cord 76 and plug 78 by turning switch 80 to the on position, blade 18 will rotate and, in cooperation with guide 22, will neatly cut any unsightly grass as the machine is manually pushed along edges 60. Of course, it will be realized that the runners 64 and foot 68 need not necessarily be pushed along the edge of a side walk, curb, or the like, these portions also being useful when the machine is pushed along the surface of the ground adjacent a fence, wall, or like construction. In any case, a vertical edging cut will be made by the machine when used in the position shown in Figure 1.

For use in trimming operations, the previously described mounting flange 28 of guide 22 is provided with a hinge plate 82 and a shield or guide 84 is provided with a corresponding hinge plate 86 so that, by the usual mechanism, shield 84 will be hingedly secured to mounting flange 28. The shield proper is provided with guide fingers 88 similar in construction and purpose to the guide fingers 24 of shield 22 as shown in Figure 5, the edge of shield 84 opposite to mounting flange 28 is provided with another hinge 90 which pivotally secures a latching plate 92 to the shield. A cylinder 94 is in turn pivotally secured as at 96 to the latching plate 92 and a plunger 96 is telescoped within the cylinder. An intermediate portion of the plunger is provided with a hook 98 and its end is formed as a finger receiving portion 100. It will be understood that the hook 98 engages in a hole (not shown) in runner plate 62 and that the plunger and cylinder are normally urged by a compression spring disposed within the cylinder to a completely collapsed position as is well understood in mechanisms of this type. Therefore, with the hook 98 engaged in the position shown in Figure 5, shield 84 will be securely held in proper relation to the blade 18 and the shield will be disposed in parallel relation to guide 22. To maintain this parallel relationship, it will be noted that an inturned flange portion 102 of the shield abuts the foot portion 68 of bracket 70. Additionally, a handle 104 is on the shield for the purpose of its manipulation when the latching mechanism is disengaged from runner plate 62. During edging operations, of course, the shield 84 must be hinged to an inoperative position overlying the handle bracket 34 as shown in Figure 1.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A lawn edger and trimmer comprising a base plate, a motor carried on one side of said plate, a handle mounted on the other side of said plate and extending away from the plate at an acute angle thereto, the mounting of said handle including a pivot pin normal to said plate and means on said base plate and engageable with a portion of said handle for latching said handle in selected rotary positions about said pin, and a rotary blade drivingly connected to said motor.

2. A lawn edger and trimmer comprising a base plate, a motor carried on one side of said plate, a handle mounted on the other side of said plate and extending away from the plate at an acute angle thereto, the mounting of said handle including a pivot pin normal to said plate and means on said base plate and engageable with a portion of said handle for latching said handle in selected rotary positions about said pin, a rotary blade drivingly connected to said motor, and a guide secured perpendicular to said plate at one edge thereof and parallel to said blade, said guide having cut-away portions defining grass-receiving spaces.

3. A lawn edger and trimmer comprising a base plate, a motor carried on one side of said plate, a handle mounted on the other side of said plate and extending away from the plate at an acute angle thereto, the mounting of said handle including a pivot pin normal to said plate and means on said base plate and engageable with a portion of said handle for latching said handle in selected rotary positions about said pin, a rotary blade drivingly connected to said motor, a guide secured perpendicular to said plate at one edge thereof and parallel to said blade, said guide having cut-away portions defining grass-receiving spaces, and a ground engaging runner assembly secured to an edge of the plate adjacent said one edge and disposed perpendicular to both said guide and said plate.

4. A lawn edger and trimmer comprising a base plate, a motor mounted on one side of said plate, an inverted U-shaped bracket mounted on the other side of said plate defining a bight portion spaced from said plate, a pivot pin secured normal to said bight portion, a handle having an angulated apertured end receiving said pin, said bight portion having a plurality of apertures disposed equidistant from said pin, a projection on said end selectively engageable within the apertures, resilient means urging said end toward said bight portion, and a rotary cutter blade drivingly connected to said motor.

5. The combination of claim 4 wherein the plane of rotation of said blade is perpendicular to said plate, a guide secured to one edge of the plate perpendicular thereto, said guide having cut-away portions defining grass-receiving spaces.

6. The combination of claim 5, wherein a ground engaging runner assembly is secured to an edge of the plate adjacent said one edge to which said guide is secured and is disposed perpendicular to both said guide and said plate.

7. The combination of claim 2 wherein a second guide is hingedly secured in spaced relation to the first mentioned guide whereby the second guide is movable from an operative portion in spaced parallel relation to the first guide to an inoperative position remote from the first guide.

8. The combination of claim 7 wherein removable latch means are provided on said second guide for latching the second guide in spaced relation to said first guide.

References Cited in the file of this patent

UNITED STATES PATENTS

| 1,245,811 | Smock | Nov. 6, 1917 |
| 1,569,987 | Lamberti | Jan. 19, 1926 |
| 2,149,463 | Orr | Mar. 7, 1939 |
| 2,404,504 | Klose | July 23, 1946 |
| 2,551,817 | Taylor | May 8, 1951 |
| 2,598,063 | La Barre | May 27, 1952 |
| 2,609,251 | Haupt | Sept. 2, 1952 |
| 2,612,741 | McKay | Oct. 7, 1952 |
| 2,617,189 | Brown | Nov. 11, 1952 |
| 2,621,463 | Skillman | Dec. 16, 1952 |
| 2,653,381 | Rooke | Sept. 29, 1953 |
| 2,660,847 | Britten III | Dec. 1, 1953 |